United States Patent [19]

Richards, Jr. et al.

[11] 4,039,927
[45] Aug. 2, 1977

[54] ELECTROSTATIC POWER SUPPLY

[75] Inventors: George Gilman Richards, Jr., Middletown; John Gilbert Berger, Elizabethtown, both of Pa.

[73] Assignee: AMP Incorporated, Harrisburg, Pa.

[21] Appl. No.: 648,225

[22] Filed: Jan. 12, 1976

[51] Int. Cl.² .......................................... H02M 3/315
[52] U.S. Cl. ........................................ 323/17; 307/58;
307/83; 307/109; 307/268; 320/1; 363/18
[58] Field of Search ................. 321/2; 323/17; 320/1;
328/118; 317/262 A; 307/52, 57, 58, 70, 83,
106–109, 110, 240, 268, 297

[56] References Cited

U.S. PATENT DOCUMENTS

| | | | |
|---|---|---|---|
| 3,611,111 | 10/1971 | Johnston | 320/1 X |
| 3,831,079 | 8/1974 | Iwata | 321/2 |
| 3,914,617 | 10/1975 | Corbel | 323/17 |

Primary Examiner—Gerald Goldberg
Attorney, Agent, or Firm—Gerald K. Kita

[57] ABSTRACT

The invention relates to a power supply circuit utilizing a DC input tied to the primary windings of two transformers. A pulse source drives either primary through a selector switch which selects the desired primary to produce a pulsed transformer output of desired polarity. The transformer secondary windings produce a voltage output discharged by a load supplying capacitor. The voltage output is maintained at a desired polarity and at a peak level by periodically pulsing the load supplying capacitor with the same amount of energy taken by the load.

2 Claims, 1 Drawing Figure

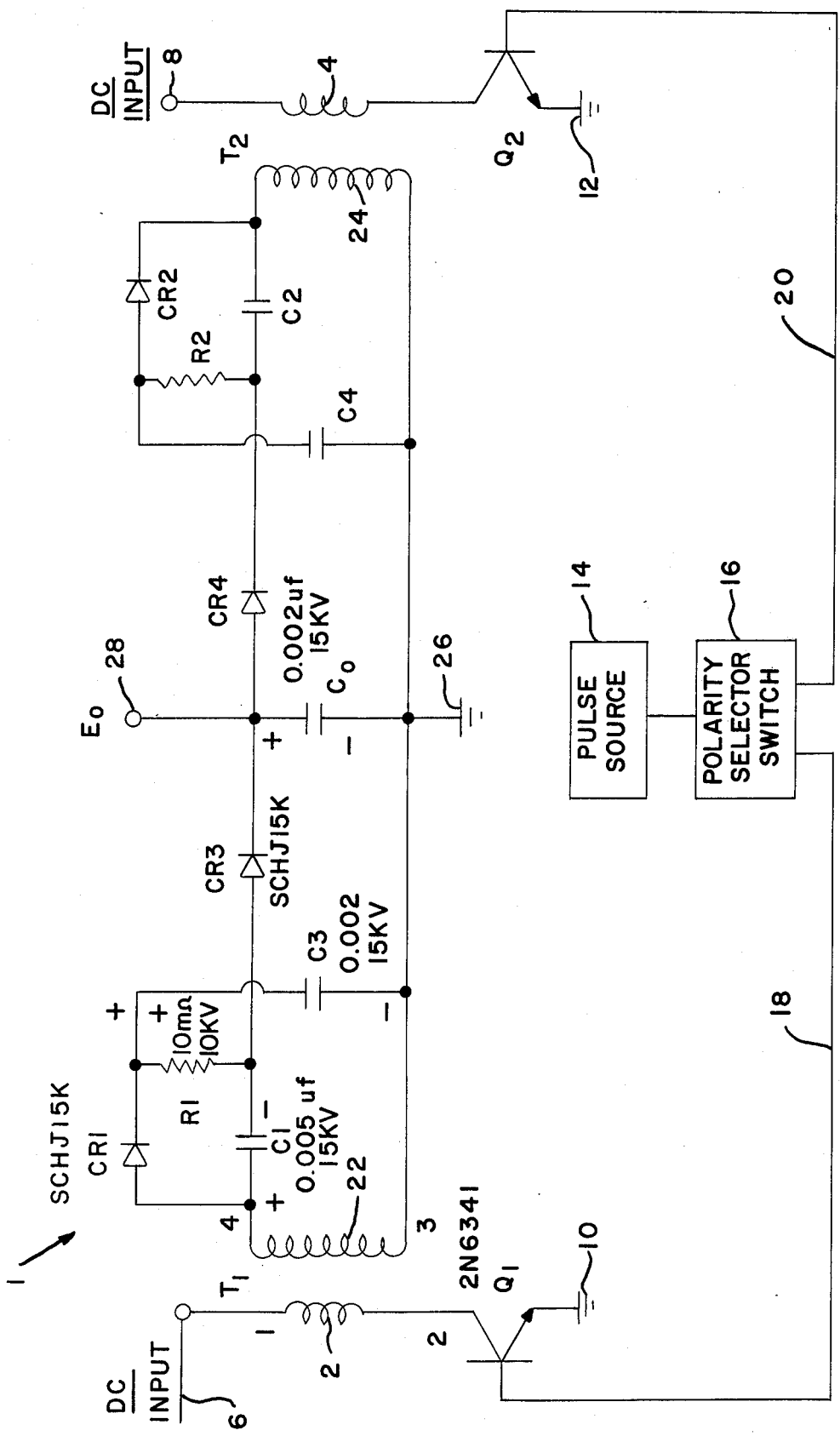

ELECTROSTATIC POWER SUPPLY

The present invention relates to a power supply of positive or negative electrostatic charge and more particularly to a pulse source drive for charging/discharging the electrostatic buildup via a transformer secondary to produce a voltage output at peak level and of a desired polarity.

The invention is useful for discharging positive or negative electrostatic charge buildup on a device. For example helicopter ordnance control or monitoring equipment must be relieved of electrostatic charge buildup to prevent a rapid, possibly destructive, discharge of this buildup upon landing. The invention is also useful for applying an electrostatic charge to an object or device such as in paper copying equipment utilizing an electrostatic charge to activate cathode emission tubes, to transfer particulate photochemicals or to pick up copy paper for transport.

The power supply circuit according to the present invention utilizes a DC input tied to the primaries of two transformers. A pulse source drives either primary through a polarity selector switch which selects the desired primary to be driven in accordance with the desired polarity output. A voltage is induced in the appropriate transformer secondary which charges a load-supplying capacitor to peak voltage. To maintain the load-supplying capacitor at peak voltage each transformer secondary simultaneously supplies an additional capacitor which replaces the energy taken by the load from the load-supplying capacitor. Each additional capacitor has its own R-C discharge path which keeps the load-supplying capacitor fully charged. The peak energy of the transformer secondary is thereby enabled to flow from the fully charged additional capacitor to become available to charge the load-supplying capacitor.

It is an object of the present invention to provide an electrostatic power supply which supplies a pulsed electrostatic output voltage at peak level and of selected polarity. capacitor.

Another object of the present invention is to provide a power supply which produces a pulsed electrostatic output at peak level and desired polarity through a load-supplying capacitor pulsed by a selected transformer secondary, the energy of the load-supplying capacitor being replaced by an additional charged capacitor having its own discharge path through the load supplying capacitor to insure that the peak energy of the transformer secondary is passed through the load supplying capacitor Other objects and many attendant advantages of the present invention will become apparent upon perusal of the following detailed description taken in conjunction with the accompanying drawing.

The FIGURE is a schematic of the power supply according to the present invention.

With more particular reference to the drawing there is illustrated generally at 1 a power supply according to the present invention. The power supply includes a pair of transformers T1 and T2. The transformers have respective primary windings 2 and 4. The windings 2 and 4 are provided with corresponding DC input locations or terminals 6 and 8, respectively. The primaries 2 and 4 further are coupled to the collectors of corresponding switch transistors Q1 and Q2, the emitters of which are referenced to ground at 10 and 12 respectively. A pulse source 14 is connected to a polarity selector switch 16 having alternative output paths 18 and 20 respectively connected to corresponding bases of the collectors Q1 and Q2.

The transformers T1 and T2 contain secondary windings 22 and 24, respectively. In the circuit loop of the transformer secondary winding 22 is a load-supplying capacitor C1 and a diode CR3 in series with a capacitor CO serving as part of the load and alleviating ripples in output voltage due to varying load conditions. One side of the circuit loop is referenced to ground at 26 adjacent to the capacitor CO. An output terminal 28 is tied to the junction of the capacitor CO and the diode CR3. The orientation of the rectifier CR3 insures that a positive voltage is supplied by the output of the transformer secondary 22 to replace the energy discharged from CO at the output terminal 28.

Similarly in the circuit loop of the transformer secondary windings 24 are located in series a load-supplying capacitor C2, a diode CR4, and the capacitor CO. The orientation of the diode CR4 insures that negative voltage is supplied by the secondary 24 to replace the energy discharge from CO to the load at the output terminal 28.

More particularly, the pulse source 14 is used to drive the switching transistors Q1 or Q2. The selector switch determines the polarity of the output voltage to be supplied at the output terminal 28. For a positive output voltage, the selector switch 16 applies the pulse drive from the pulse source 14 to the base of transistor Q1 causing Q1 to turn on and thereby create a current flow from the DC input to the primary windings 2 of the transformer T1 and through the emitter collector junction of transistor Q1. The current flow in the primary 2 induces a corresponding voltage and current output in the secondary which flows through C1 and CO. The output voltage of the secondary is impressed across the capacitor C1 and CO and is divided inversely in relationship to their capacitance values.

At the junction of the transformer secondary windings 22 and the capacitor C1 is connected a diode CR1 in series with a resistor R1. The diode CR1 and resistor R1 are in parallel with the capacitor C1 and are additionally connected at the junction of the capacitor C1 and the rectifier CR3. The resistor R1 further is in series with an additional capacitor C3 which is referenced to the ground side of the transformer secondary circuit loop at 26 and which is also connected at the junction of the resistor R1 and the diode CR1. In similar fashion, the junction of the transformer secondary windings 24 and the capacitor C2 is provided with a diode CR2 and a series-connected resistor R2 in parallel with the capacitor C2. An additional capacitor C4 is referenced to the ground side of the circuit loop at 26 and is connected at the junction of the resistor R2 and the diode CR2.

Initially C2 and C4 will also charge to the voltage level of the capacitor CO. The capacitor C2 and C4 however do not have a discharge path, so they will become charged and will remain at a given voltage level. These capacitors thus become eliminated from the circuit and the instantaneous operation of the power supply. As shown in the figure, an alternate current path is provided through diode CR1 which charges capacitor C3 to the peak voltage output of the transformer secondary 22. The voltage potential of the capacitor C3 is utilized to discharge the capacitor C1 within a relatively short period of time without also changing the voltage level established across CO.

The output voltage supplied to a load at the output terminal 28 is manifest in pulse form upon discharge of the capacitor CO. It is desirable in the present invention to maintain a relative constant output voltage throughout duration of the pulse. A relatively constant output voltage can only be maintained if the energy taken by the load from discharge of capacitor CO is continuously and immediately replaced. The energy supplied to recharge CO flows from the transformer secondary windings 22 through the capacitor C1. Under ordinary circumstances the energy flowing through C1 would charge C1 thereby reducing the voltage available to charge CO. To prevent reduction in secondary voltage during recharge of CO, a discharge path must be provided to discharge C1. R1 and C3 form such a discharge path, the charged capacitance of which keeps the capacitor C1 fully charged. The peak energy of the transformer secondary thereby flows thru the fully charged capacitor C1 and becomes available to replace the energy lost to the load at the capacitor CO. The pulse duration of the voltage supplied at the output terminal 28 is controlled by the duration of the pulse emanating from the pulse source 14. The voltage level of the output at terminal 28 can be maintained substantially constant throughout the duration of the pulse by insuring that the energy drained from the capacitor CO is replaced by the peak output energy from the transformer secondary 22.

If a negative polarity output voltage is to be obtained at the output terminal 28, the polarity selector switch applies the pulse emanating from the pulse source 14 to the base of the transistor Q2 causing Q2 to turn on and thereby produce a current flow from the DC input through the transformer primary windings 4 and through the emitter and collector of the transistor Q2. A corresponding output voltage is induced in the transformer secondary windings 24. Resistor R2 and additional capacitor C4 form a discharge path for the capacitor C2, allowing C2 to be fully charged such that the peak output voltage of the transformer secondary 24 is fully available to resupply CO with energy being drained by the load at the output terminal 28.

In all cases the resistors R1 and R2 must be sufficiently high in resistance value to minimize drain from the output or load supplying capacitor CO. The values of the components shown in the drawing are supplied as exemplary.

Although a preferred embodiment of the present invention is disclosed in detail other modifications and embodiments which would be apparent to one having ordinary skill in the art are intended to be covered by the spirit and scope of the appended claims.

What is claimed is:

1. An electrostatic power supply for supplying an output pulse of selected polarity and peak voltage throughout duration of said pulse, comprising:

transformer means having first and second transformer primaries connected to a D.C. input, each said primary being coupled to reference potential through a normally nonconductive transistor switch, a pulse source and a polarity selector switch in series with a base of each said transistor switch to supply a pulse selectively to one said transistor switch and render a selected one said primary conductive, said transformer means having first and second transformer secondaries connected to a common load forming capacitor, each secondary including a rectifier and a load supplying capacitor in series with said load forming capacitor, a corresponding one said secondary having a current induced therein upon conduction of said selected one primary, and means in each said secondary coupled to a corresponding said load supplying capacitor for applying peak secondary voltage thereto whereby said load supplying capacitor remains fully charged and whereby peak energy of said secondary passes through said load supplying capacitor to replace energy drain from said load forming capacitor.

2. The structure as recited in claim 1, wherein, said means comprises:

an alternate series circuit in each said secondary including a resistor and an additional capacitor in series with said load supplying capacitor, and a diode coupled across said load supplying capacitor and said resistor.

* * * * *